US005907522A

United States Patent [19]

Teodoridis et al.

[11] Patent Number: 5,907,522

[45] Date of Patent: May 25, 1999

[54] PORTABLE DEVICE FOR RECEIVING AND/ OR TRANSMITTING RADIO-TRANSMITTED MESSAGES COMPRISING AN INDUCTIVE CAPACITIVE ANTENNA

[75] Inventors: Viron Teodoridis, Hauterive; Felix Gassmann, Zürich; Francesco Spina, Lausanne, all of Switzerland

[73] Assignee: Eta SA Fabriques d'Ebauches, Grenchen, Switzerland

[21] Appl. No.: 08/840,013

[22] Filed: Apr. 24, 1997

[30] Foreign Application Priority Data

May 3, 1996 [FR] France .................................. 96 05571

[51] Int. Cl.[6] ............................ G04D 47/00; H04B 1/08; H05G 1/14

[52] U.S. Cl. ............................ 368/10; 343/718; 343/866; 343/867; 368/281; 368/278; 455/344; 455/351; 455/100

[58] Field of Search .................................... 343/718, 866, 343/867; 368/10, 281, 47, 276, 278; 455/344, 351, 100, 575, 550; H04B 1/08; H05G 1/14; G04D 47/00

[56] References Cited

U.S. PATENT DOCUMENTS

| | | | |
|---|---|---|---|
| 4,884,252 | 11/1989 | Teodoridis et al. | 368/10 |
| 5,699,319 | 12/1997 | Skrivervik | 368/10 |
| 5,737,699 | 4/1998 | Farrar et al. | 455/344 |

FOREIGN PATENT DOCUMENTS

| | | |
|---|---|---|
| 0 312 792 | 4/1989 | European Pat. Off. . |
| 2 276 274 | 9/1994 | United Kingdom . |

*Primary Examiner*—Robert H. Kim
*Assistant Examiner*—Layla G. Lauchman
*Attorney, Agent, or Firm*—Griffin, Butler, Whisenhunt & Szipl, LLP

[57] ABSTRACT

Portable device for receiving and/or transmitting radio-transmitted messages comprising:

a case (11; 42; 51), an antenna (12; 31, 32; 52, 53) capable of picking up both a magnetic component and an electric component of an electromagnetic field carrying radio-transmitted messages, and a micro-receiver (13) receiving the messages picked up by the antenna, said antenna comprising two conductive plates (15, 16; 31, 32; 52, 53) disposed so as to pick up the radial electric component ($E_r$) of said electromagnetic field with respect to the body of the wearer.

The antenna (12; 31, 32; 52, 53) is formed by a coil (17) comprising a turn arranged in said case (11; 42; 51) to pick up the azimuthal magnetic component ($H_\Phi$) of said electromagnetic field around said body and the plates (15, 16; 31, 32; 52, 53) form part of said coil (17).

7 Claims, 3 Drawing Sheets

Fig . 1
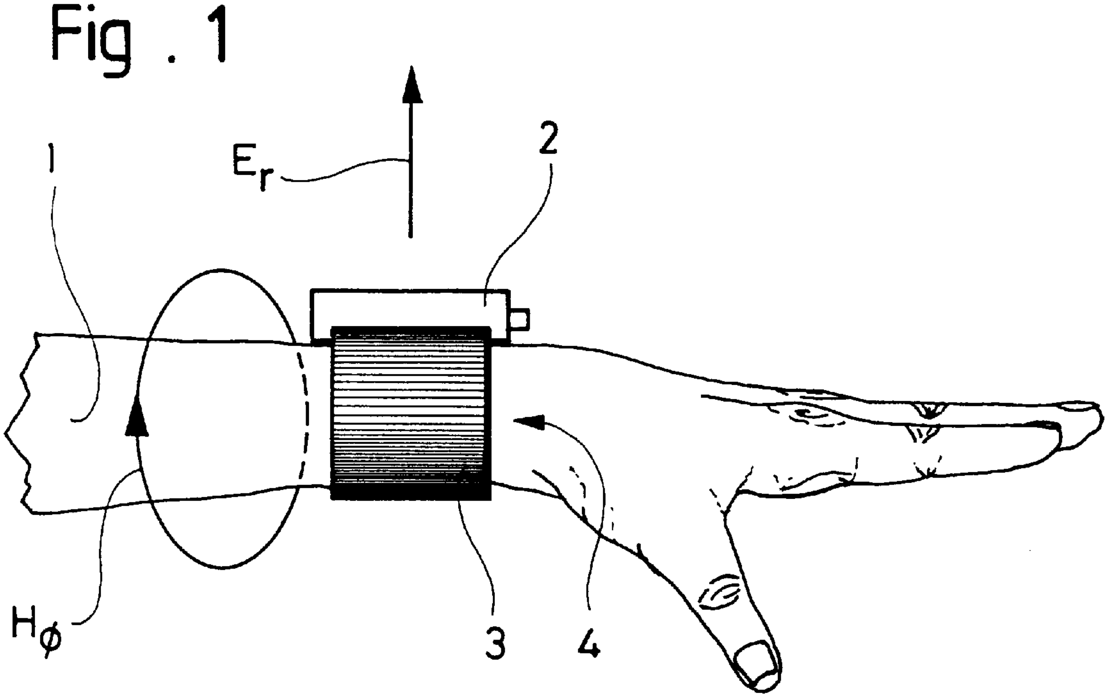
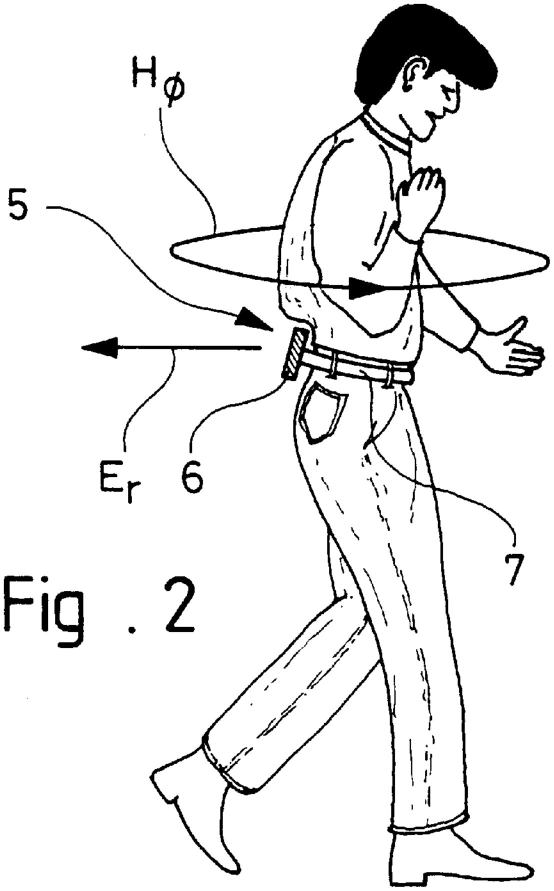
Fig . 2

PORTABLE DEVICE FOR RECEIVING AND/OR TRANSMITTING RADIO-TRANSMITTED MESSAGES COMPRISING AN INDUCTIVE CAPACITIVE ANTENNA

The present invention concerns a portable device for receiving and/or transmitting radio-transmitted messages which comprises an antenna capable of picking up an electromagnetic field carrying radio-transmitted messages.

Portable devices of this type, which sometimes take the form of a timepiece such as a wristwatch, are already known. An embodiment of such an arrangement is disclosed in European Patent No. 0 312 792. This document discloses a wristwatch comprising an antenna and a micro-receiver arranged in a case. The antenna comprises a first conductive element in the shape of a loop situated in the upper part of the case and a second conductive element connected to the ground voltage of the micro-receiver arranged in the lower part of the case. A matching and tuning circuit connects these two conductive elements to the inputs of the micro-receiver.

The first element of the antenna forms with the second conductive element a capacitive doublet sensitive to an electric component of the electromagnetic field carrying radio-transmitted messages. The first element allows a loop sensitive to a magnetic component of the electromagnetic field to be formed. Thus, the antenna can be said to have a mixed electric and magnetic aspect since it is sensitive both to electric and magnetic components of the electromagnetic field.

The two conductive elements are arranged in planes parallel to the watch case dial. Consequently, the loop formed by the first element picks up the radial magnetic component of the electromagnetic field with respect to the user's wrist and the capacitive doublet formed by the two conductive elements picks up the radial electric component of the electromagnetic field with respect to the user's wrist.

An arrangement of this type poses problems of reception sensitivity since the two components which are picked up are not those which are optimum close to the surface of a user's body. Moreover, this portable receiving device has a significant variation as a function of the frequency of the electromagnetic field which is picked up.

An object of the present invention is to provide a portable device for receiving radio-transmitted messages which at least partly overcomes these drawbacks.

Another object of the invention is to provide a portable device for receiving radio-transmitted messages whose antenna gain-band-width product is optimised.

Another object of the invention is to provide a portable device for receiving radio-transmitted messages which allows regular behavior whatever the frequency of the electromagnetic field which is picked up.

Moreover, an object of the invention is to provide a portable device for receiving radio-transmitted messages which comprises a single antenna and whose construction is simple and requires little space.

The invention thus concerns a portable device for receiving and/or transmitting radio-transmitted messages intended to be worn on a part of the body having a cylindrical shape such as an arm or the trunk. The device comprises a case, an antenna capable of picking up both a magnetic component and an electric component of an electromagnetic field carrying radio-transmitted messages, and a micro-receiver receiving the messages picked up by the antenna. The antenna comprises two conductive plates disposed so as to pick up the radial electric component of the electromagnetic field with respect to the body. The antenna is formed by a coil comprising one turn arranged in the case for picking up the azimuthal magnetic component of the electromagnetic field around said part of the body. The plates form part of the coil.

In an advantageous manner, the present invention allows a portable device for receiving radio-transmitted messages to be achieved wherein the antenna picks up the radial electric and azimuthal magnetic components of an electromagnetic field, which, on the one hand, increases the yield of the antenna and, on the other hand, makes the antenna less sensitive to frequency variations of the picked up electromagnetic field.

Other features and advantages of the invention will appear during the following description, which is given solely by way of example and is made with reference to the attached drawing in which:

FIG. 1 is a schematic view of the wrist of a user wearing an embodiment of a portable receiving device according to the present invention;

FIG. 2 shows a human figurine wearing another embodiment of a portable receiving device according to the present invention;

Figure 3:
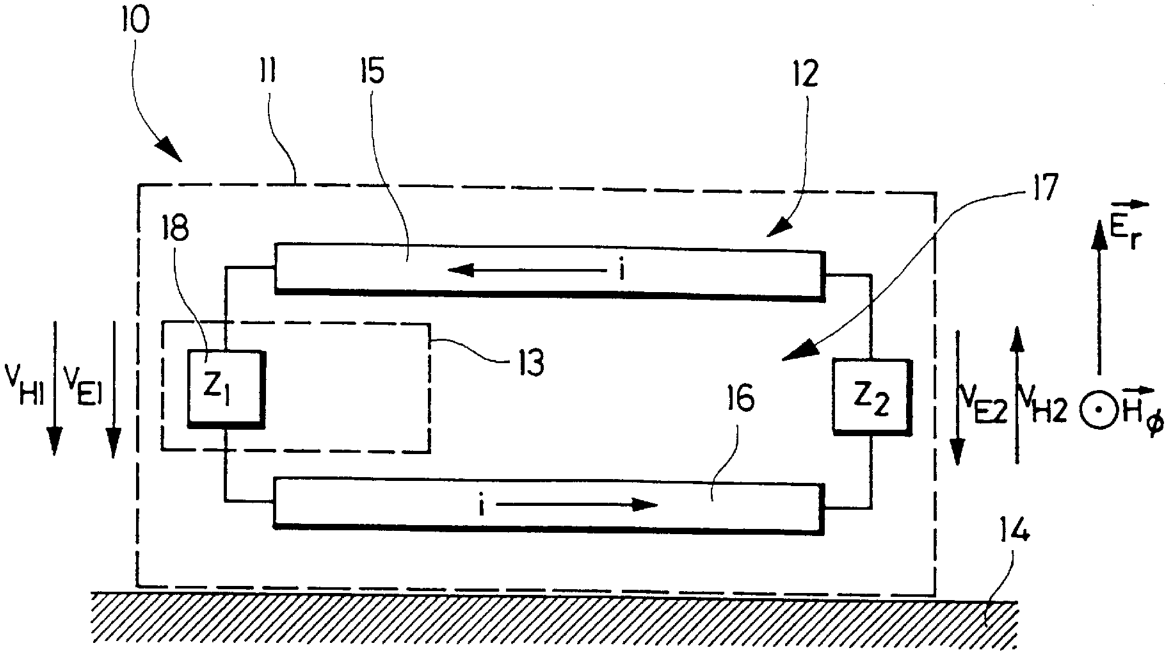
FIG. 3 is a schematic view of the portable receiving device of FIG. 1.

It is known that the electric and magnetic components of an electromagnetic field are mutually perpendicular. Consequently an electric component of the field may be picked up by a capacitive antenna whereas a magnetic component may be picked up by an inductive antenna. A capacitive antenna takes the form of two electrodes separated by a dielectric and an inductive antenna is in the form of a coil. Dielectric must be understood to mean here an insulating material separating the two electrodes, such material may also be air. The polarisation of the electric component picked up from the incident field is perpendicular to the electrodes of the capacitive antenna while the polarisation of the magnetic component picked up from the incident field is parallel to the axis of the coil of the inductive antenna.

Since the present invention relates to a receiving device intended to be worn on a part of a user's body, it is important to know the influence of such body on the configuration of the electromagnetic field. It has been determined that the amplitude and the direction of the electromagnetic field are greatly modified in the proximity to the body, this being mainly due to the fact that the dielectric properties of the human body are very different to those of air.

Various studies have allowed it to be established that, if the human body is irradiated by an electromagnetic field, on the one hand, the electric component of the field is essentially perpendicular to the skin of the body at a distance of less than 15 cm from the surface of the body or from the part of the body in question and, on the other hand, that the magnetic component of the field rotates essentially about the body or the part of the body in question (for example the wrist) at a distance of less than 15 cm from the surface of the body. The word "radial" will be used hereinafter to describe this electric component of the field and the word "azimuthal" will be used to describe this magnetic component of the field.

FIG. 1 shows a forearm 1 of a user wearing a receiving device according to the invention which takes the form of a wristwatch 4 comprising a case 2 and a wristlet 1. The two predominant components $E_r$ (radial electric component) and $H_\Phi$ (azimuthal magnetic component) act on case 2.

FIG. 2 shows a human figurine wearing a portable receiving device 5 comprising a case 6 attached to a belt 7. Radial electric component $E_r$ and azimuthal magnetic component $H_\Phi$ of a electromagnetic field carrying radio-transmitted messages also act on this portable receiving device 5.

Referring now to FIG. 3, there is seen a schematic view of a portable receiving device 10 according to the invention which comprises a case 11, a single antenna 12 capable of picking up both azimuthal magnetic component $H_\Phi$ and radial electric component $E_r$ of an electromagnetic field carrying radio-transmitted messages and a micro-receiver 13 receiving the messages picked up by the antenna in order to transform such messages into data able to be perceived by the user of the portable receiving device. This device is worn by the user in such a way that the case is close to his body 14.

Antenna 12 comprises two conductive plates 15 and 16 placed substantially parallel to each other and separated by air or any other dielectric. Plates 15 and 16 are arranged in case 11 for picking up radial electric component $E_r$ of the electromagnetic field with respect to body 14. In order to maximise the antenna yield, plates 15 and 16 are preferably mounted in case 11 so that they are substantially parallel to the surface of the user's skin facing the portable receiving device when the device is worn by the user.

Figure 4:
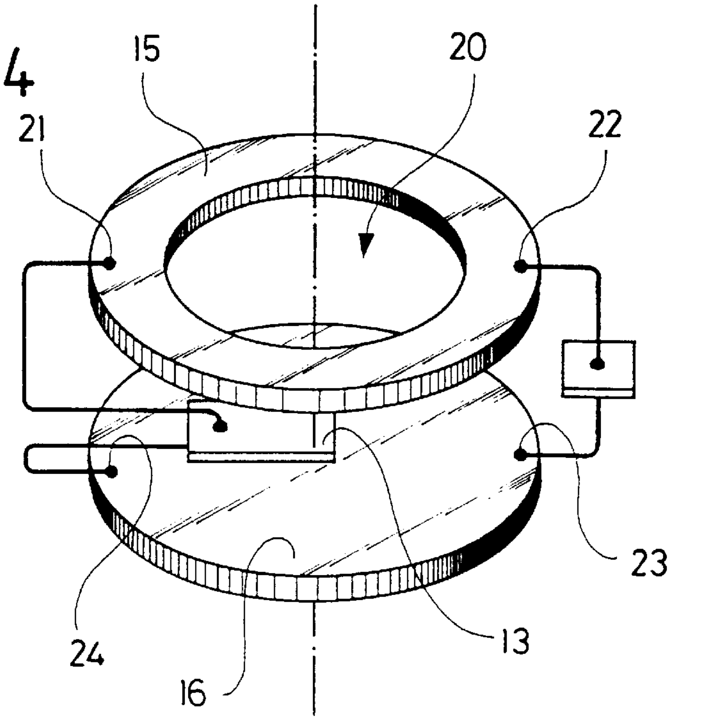
FIG. 4 is a perspective view of a detail of the portable receiving device of FIG. 3.

FIGS. 3 and 4 show that antenna 12 is formed by a coil 17 comprising, in this example, a single turn disposed in case 11 so as to pick up azimuthal magnetic component $H_\Phi$ of the electromagnetic field around body 14. The antenna is preferably mounted in case 11 so that the longitudinal axis of the coil is substantially perpendicular to the surface of the user's skin facing the portable receiving device, and disposed perpendicular to the longitudinal axis of the cylindrical body part in question, when this device is worn by the user.

According to the invention, plates 15 and 16 form part of coil 17. Thus, portable receiving device 10 comprises a single antenna 12 which benefits from two predominant components of the electromagnetic field carrying radio-transmitted messages, namely radial electric component $E_r$ and azimuthal magnetic component $H_\Phi$. By allowing the use of these two components at the same time, the antenna yield is increased.

Plates 15 and 16 preferably comprise connecting zones 21 to 24 via which they are connected to the remaining part of coil 17. Connecting zones 21 and 22 are disposed at diametrically opposite locations on plate 15. Likewise, connecting zones 23 and 24 are disposed at diametrically opposite locations on plate 16. In the example shown in FIGS. 3 and 4, connecting zones 21 to 24 are disposed in a peripheral region of plates 15 and 16. The resulting arrangement is relatively simple and efficient and allows the formation of an antenna which has optimum electromagnetic dimensions with respect to the physical dimensions of case 11.

In order to increase the efficiency of the antenna, coil 17 is preferably disposed in the case in such a way that its longitudinal axis is substantially parallel to azimuthal magnetic component $H_\Phi$ when said device is worn by a user. Likewise, it is preferable for the two conductive plates to be substantially perpendicular to radial electric component $E_r$ when said device is worn by the user.

In an advantageous manner, the portable receiving device is well suited to various applications in all frequency bands since the antenna has very little practical minimum or maximum frequency limitation. Even in the hypothetical case of a reduction of the effect of the human body for azimuthal magnetic component $H_\Phi$ at low frequencies, there is no corresponding frequency limitation for radial electric component $E_r$, even at a frequency of 0 Hz.

Micro-receiver 13 receives the messages picked up by the antenna and transforms such messages into data able to be perceived by the user. For this purpose, micro-receiver 13 comprises a matching and tuning circuit 18 which, in a known manner, allows the tuning of the resonant circuit formed by antenna 12 to be completed and if necessary, the resonance frequency of the antenna to be adjusted.

As a result of the high yield of antenna 12 and the fact that radial electric component $E_r$ picked up by antenna 12 is not very sensitive to frequency changes of the electromagnetic field carrying radio-transmitted messages, antenna 12 may easily be adapted to function as a wide band antenna in a desired frequency range. In order to achieve this, matching and tuning circuit 18 must simply be adjusted so that the narrow band around the resonance frequency of the antenna is placed outside this desired frequency range. Thus, the antenna will be able to have a regular behavior whatever the frequency in this frequency range.

However, the antenna may also be used as a resonant antenna by adjusting matching and tuning circuit 18 so that the antenna resonance frequency is brought into the desired frequency range.

It may be considered that the two plates 15 and 16 are connected to each other by load circuits Z1 and Z2. Each of load circuits Z1 and Z2 may be formed simply by a conductive element having a minimum electrical resistance which forms the remaining part of coil 17?, and/or by resistive, capacitive and/or inductive elements, such as for example, matching and tuning circuit 18 which forms load circuit Z1 in antenna 12 shown in FIG. 3. Each of load circuits Z1 and Z2 may also be formed by a short-circuit or an open circuit.

As is seen in FIG. 3, a current i is induced in coil 17 by azimuthal magnetic component $H_\Phi$ (coming out of the page in FIG. 3) of the electromagnetic field picked up by coil 17. Current i rotates in an anticlockwise direction. There results a positive induced voltage $V_{H1}$ through load circuit Z1 and a negative induced voltage $V_{H2}$ through load circuit Z2.

Conversely, the voltages induced by radial electric component $E_r$ are equal and positive through the two load circuits Z1 and Z2. It is thus to be noted that voltages $V_{E1}$ and $V_{E2}$ which are induced by the two components are added together through load circuit Z1 and subtracted from each other through load circuit Z2. Consequently, one may connect the input of micro-receiver 13 through load circuit Z1 to increase further the yield of antenna 12.

FIG. 4 shows an embodiment of conductive plates 15 and 16 and micro-receiver 13 of FIG. 3. Each of the two plates may have one or several openings, such as central opening 20. Plate 15 is disposed in the upper part of case 11 of portable receiving device 10 whereas plate 16 is disposed in the lower part of case 11.

Figure 5:
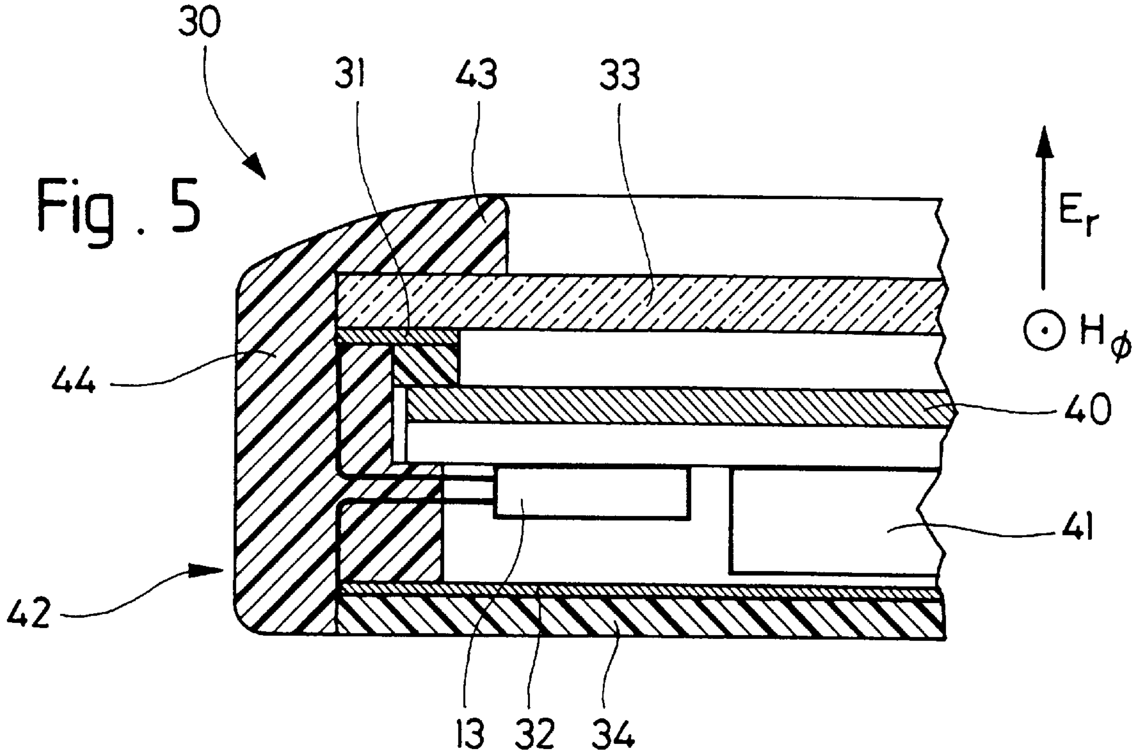
FIG. 5 is a cross-section of an embodiment of the portable receiving device according to the invention which is in the form of a wristwatch.

An arrangement of this type could be useful in the event that antenna 12 is incorporated in a wristwatch. FIG. 5 shows a cross-section of a portable receiving device in the form of a wristwatch 30. This wristwatch comprises a dial 40 and a movement 41 housed in a case 42. The antenna disposed in watch 30 comprises a first conductive plate 31 and a second conductive plate 32. In this example, upper plate 31 has the same shape as that shown in FIG. 4 so that it is hidden from view by an annular part 43 of case 42. Plate 31 shown in FIG. 5 is formed by peripheral metallisation of crystal 33.

Plate 32 may be a metal back cover which is entirely metal or, as shown in FIG. 5, a metal sheet affixed to a back cover 34 made of plastic.

However, plates 31 and 32 may be mounted in receiving device 30 in accordance with several alternatives. For example, at least one of the plates could also be disposed on the dial or any other elements of the portable receiving device 30 or it could form this element itself. At least one of the plates could also be embedded in the back of case 42 or in any other part of the portable receiving device 30.

Likewise plates 31 and 32 may formed according to several alternatives, for example, at least one of the plates could be formed by a metal deposition, by a separately made conductive element or by a grid.

Plates 31 and 32 abut a middle part 44 made of an insulating material. Plates 31 and 32 are connected to the input of micro-receiver 18 which is mounted in case 42 between dial 33 and back cover 34.

Figure 6:
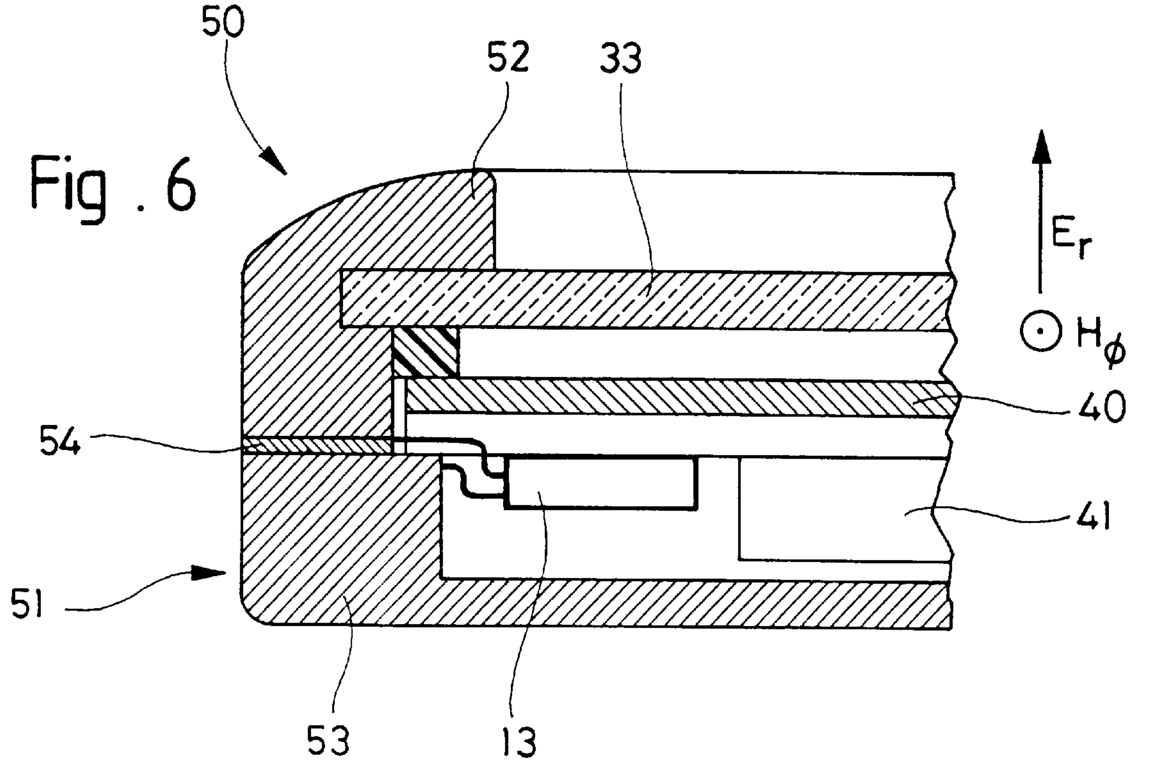
FIG. 6 is a cross-section of another embodiment of the portable receiving device according to the invention which is in the form of a wristwatch.

FIG. 6 shows a cross-section of a second embodiment of a portable receiving device in the form of a wristwatch 50. This wristwatch comprises dial 40, movement 41 and micro-receiver 13 shown in FIG. 5, which are housed within a case 51. In this embodiment, the antenna comprises two conductive plates which are not necessarily flat, namely a first conductive plate 52 and a second conductive plate 53 which respectively form an upper part and a lower part of case 51. Plates 52 and 53 are separated by an annular disc 54 which is made of an insulating material.

This arrangement allows the antenna yield to be increased since plates 52 and 53 have a maximum surface with respect to the dimensions of portable receiving device 50 itself.

In this example, the two plates 52 and 53 both form part of case 51. However, in an alternative embodiment, only one of the plates could be formed by a part of the case.

Finally, it is to be noted that several modifications and/or adaptations may be made to the device according to the invention without departing from the framework of the invention. Indeed, although the embodiments described hereinabove mainly concern a portable receiving device in the form of a wristwatch, the principal of this antenna may also be used for other horlogical applications or for conventional portable receiving devices.

What is claimed is:

1. A portable device for receiving and/or transmitting radio-transmitted messages intended to be worn on a part of the body having a cylindrical shape such as an arm or the trunk of the body, said device comprising:

a case, an antenna capable of picking up both a magnetic component and an electric component of an electromagnetic field carrying radio-transmitted messages, and a micro-receiver receiving the messages picked up by the antenna, said antenna comprising two conductive plates disposed so that they pick up the radial electric component ($E_r$) of said electromagnetic field with respect to said body, wherein said antenna is formed by a coil comprising a turn arranged in said case for picking up the azimuthal magnetic component ($H_\Phi$) of said electromagnetic field around said part of the body and wherein said plates form part of said coil.

2. Device according to claim 1, wherein each of said plates comprises connecting zones which are diametrically opposite and via which it is connected to the remaining part of said coil.

3. Device according to claim 1, wherein said connecting zones are disposed in a peripheral region of said plates.

4. A device according to claim 1, wherein said coil is disposed in said case in such a way that its longitudinal axis is substantially parallel to said azimuthal magnetic component ($H_\Phi$) when said device is worn.

5. A device according to claim 1, wherein said antenna further comprises at least one load circuit which connects said plates, and wherein said micro-receiver is connected to said coil through said load circuit through which voltages induced by said azimuthal magnetic component ($H_\Phi$) and said radial electric component ($E_r$) are added together.

6. A device according to claim 1, said device being intended to pick up electromagnetic fields within a determined frequency range wherein said micro-receiver comprises a matching and tuning circuit adjusted so that a narrow band around the resonance frequency of the antenna is placed outside said determined frequency range.

7. A device according to claim 1, wherein it takes the form of a wristwatch.

* * * * *